US005530567A

United States Patent [19]

Takei

[11] Patent Number: 5,530,567
[45] Date of Patent: Jun. 25, 1996

[54] POLYMER DISPERSED LIQUID CRYSTAL DISPLAY DEVICE HAVING ENCAPSULATED LIQUID CRYSTAL SURROUNDED BY POLYMER MATRIX LIQUID CRYSTAL AND METHOD OF MANUFACTURING THE SAME

[75] Inventor: Jiro Takei, Tama, Japan

[73] Assignee: Casio Computer Co., Ltd., Tokyo, Japan

[21] Appl. No.: 264,787

[22] Filed: Jun. 23, 1994

[30] Foreign Application Priority Data

Jun. 29, 1993 [JP] Japan .................................. 5-158437

[51] Int. Cl.$^6$ ........................................................ G02F 1/13
[52] U.S. Cl. ................................ 359/51; 359/52; 359/81
[58] Field of Search ............................ 359/51, 52, 81

[56] References Cited

U.S. PATENT DOCUMENTS

| 5,208,687 | 5/1993 | Yoshida et al. ........................ 359/52 |
| 5,394,256 | 2/1995 | Yamada et al. ........................ 359/51 |

FOREIGN PATENT DOCUMENTS

| 0508592A3 | 10/1992 | European Pat. Off. . |
| 0543658A3 | 5/1993 | European Pat. Off. . |
| 0540353A3 | 5/1993 | European Pat. Off. . |
| 5323293 | 12/1993 | Japan ........................ 359/51 |
| 6222340 | 8/1994 | Japan ........................ 359/51 |

*Primary Examiner*—Anita Pellman Gross
*Assistant Examiner*—James A. Dudek
*Attorney, Agent, or Firm*—Frishauf, Holtz, Goodman, Langer & Chick

[57] ABSTRACT

A polymer dispersed liquid crystal display device includes opposing substrates having transparent electrodes formed on opposing surfaces thereof, and a composite film arranged between the substrates and having an arrangement obtained by dispersing a liquid crystal in a polymer. The composite film includes a phase-separation polymer dispersed liquid crystal layer constituted by a composite film consisting of a liquid crystal and a polymer, and liquid crystal capsules which are dispersed in the phase separation polymer dispersed liquid crystal layer and in which a liquid crystal is sealed. Each of the liquid crystal capsules has an outer diameter equal to a gap between the substrate and functions as a spacer for regulating the gap between the substrate. Liquid crystal molecules in the liquid crystal capsules, like liquid crystal molecules in the polymer dispersed liquid crystal layer, are aligned in accordance with a voltage applied across the opposing electrodes to transmit or scatter incident light.

20 Claims, 7 Drawing Sheets

POLYMER DISPERSED LIQUID CRYSTAL DISPLAY DEVICE HAVING ENCAPSULATED LIQUID CRYSTAL SURROUNDED BY POLYMER MATRIX LIQUID CRYSTAL AND METHOD OF MANUFACTURING THE SAME

BACKGROUND OF THE INVENTION

1. Field of the Invention

The present invention relates to a polymer dispersed liquid crystal display device and a method of manufacturing the same, and more particularly, to a polymer dispersed liquid crystal display device capable of displaying a high-quality image and a method of manufacturing the same.

2. Description of the Related Art

A polymer dispersed liquid crystal display device is formed such that a composite film consisting of a polymer resin and a liquid crystal and formed by dispersing the polymer and the liquid crystal is arranged between a pair of transparent substrates having transparent electrodes formed thereon. This composite film has a structure obtained by confining a liquid crystal (domains of a liquid crystal) in each space of a polymer resin layer having a sponge-like sectional structure. Note that, as the liquid crystal, a nematic liquid crystal having positive dielectric anisotropy is generally used.

The polymer dispersed liquid crystal display device is driven by applying a voltage across the electrodes of both the substrates. In a state wherein no voltage is applied, the molecules of the liquid crystal of the composite film are pointed in various directions. In this state, light transmitted through the composite film is scattered by the light scattering effect of the interface between the liquid crystal and the polymer and the liquid crystal domains. When a voltage exceeding a voltage having a predetermined threshold value is applied across the electrodes, the molecules of the liquid crystal of the composite film are aligned in a direction substantially perpendicular to the substrate surfaces. In this state, light is transmitted through the composite film under almost no influence of the light scattering effect. In other words, the polymer dispersed liquid crystal display device controls scattering and transmission of light to display an image.

The polymer dispersed liquid crystal display device is generally formed by the following processes.

(1) A pair of transparent substrates are bonded to each other through a frame-like seal member.

(2) A solution mixture of a liquid crystal and a polymerization material which causes a polymerization reaction with light is sealed in an area surrounded by the pair of substrates and the seal member. (3) Light (ultraviolet ray) is radiated on the polymerization material of the solution mixture to polymerize the polymerization material, thereby forming a composite film. When this manufacturing method is used, if the gap between both the substrates is ununiformed, the thickness of the formed composite film become ununiformed, and an ununiformed display occurs.

For this reason, in the polymer dispersed liquid crystal display device, as in a TN type liquid crystal display device or the like, when a pair of transparent substrates are connected to each other through a seal member, spacers are arranged at various positions between the pair of transparent substrates to make the gap between the substrates uniform.

As the spacers, grains or short fibers consisting of glass, a hard resin, or the like are conventionally used. The spacers include transparent spacers and opaque black spacers.

In a polymer dispersed liquid crystal display device in which the gap between substrates is uniformed by transparent spacers, even in a state wherein no voltage is applied across the opposing electrodes (a state wherein the molecules of the liquid crystal of a composite film are pointed in various directions, and a dark display is performed), light transmitted through the spacer portion is transmitted through the spacers without being scattered. For this reason, an observer sees a display image as if bright points formed by the light transmitted through the space portion are present at various positions of the display image.

In a polymer dispersed liquid crystal display device in which the gap between substrates is uniformed using black spacers, even in a voltage application state (a state wherein the molecules of the liquid crystal of a composite film are uniformly aligned in a direction perpendicular to the major surfaces of the transparent substrate, and a bright display is performed), light transmitted through a spacer portion is absorbed by the spacers. For this reason, an observer sees a display image as if black points formed by the shadows of the spacers are present at various positions in the display image.

For this reason, in a conventional polymer dispersed liquid crystal display device, the bright or black points described above are present at various positions in the display image, and the quality of the display image is poor. In particular, when the conventional polymer dispersed liquid crystal display device is used as the display section of a liquid crystal projector in which the display image of the liquid crystal display device is enlarged by a lens and projected on a screen, the bright or black points become conspicuous, and the display quality is more degraded. In addition, the conventional polymer dispersed liquid crystal display device cannot obtain a high contrast.

SUMMARY OF THE INVENTION

It is an object of the present invention to provide a polymer dispersed liquid crystal display device capable of obtaining a high-quality display image free from bright or black points formed by spacers in the display image, and a method of manufacturing the same.

It is another object of the present invention to provide a polymer dispersed liquid crystal display device capable of easily controlling the gradation of a display image, and a method of manufacturing the same.

In order to achieve the above objects, according to the present invention, there is provided a polymer dispersed liquid crystal display device comprising:

a pair of opposing substrates and having electrodes formed on opposing surfaces thereof; and a composite film arranged between the pair of substrates and having a plurality of first liquid crystal domains each of which is obtained by surrounding a liquid crystal with a polymer thin film and a plurality of second liquid crystal domains which are formed such that a liquid crystal is continuously present in a polymer thin film.

According to the present invention, there is provided a method of manufacturing a polymer dispersed liquid crystal display device, comprising the steps of:

preparing liquid crystal capsules in which a liquid crystal is sealed;

preparing a solution mixture of a liquid crystal and a polymerization material;

mixing the solution mixture with the liquid crystal capsules;

arranging a mixture of the solution mixture and the liquid crystal capsules between a pair of opposing substrates having transparent electrodes formed on opposing surfaces thereof; and polymerizing the polymerization material in the mixture to cause phase separation between the liquid crystal and a polymer resin, thereby forming a composite film obtained by dispersing the liquid crystal and the liquid crystal capsules in a layer consisting of the polymer resin.

Each of the liquid crystal capsules has an outer diameter, e.g., substantially equal to a gap between the transparent electrodes of the pair of transparent substrates, and the liquid crystal capsules function as spacers for regulating the gap between the pair of transparent substrates.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2 and 3 are enlarged sectional views showing a polymer dispersed liquid crystal display device of a simple matrix type according to the first embodiment of the present invention, in which FIG. 2 is an enlarged sectional view of the polymer dispersed liquid crystal display device in a state wherein no voltage is applied to a liquid crystal and FIG. 3 is an enlarged sectional view showing the polymer dispersed liquid crystal display device in a state wherein a voltage is applied to the liquid crystal;

DETAILED DESCRIPTION OF THE PREFERRED EMBODIMENTS

Embodiments of the present invention will be described below with reference to the accompanying drawings.

(First Embodiment)

Figure 1:
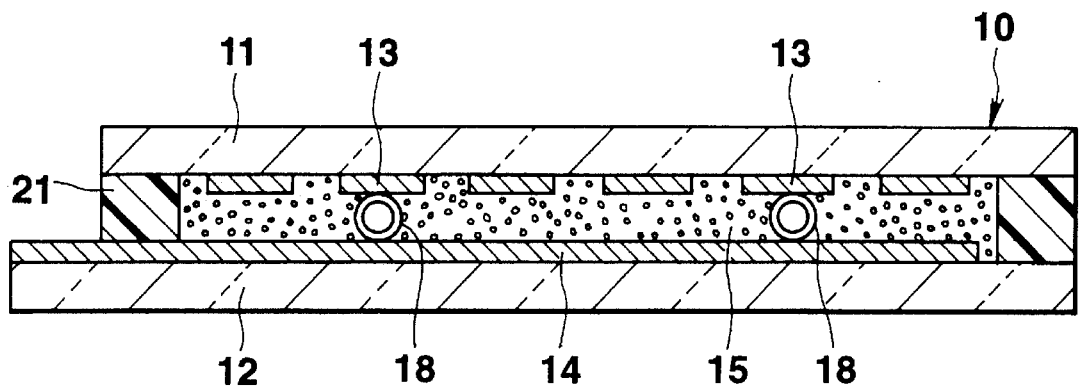
FIG. 1 is a schematic sectional view showing an entire polymer dispersed liquid crystal display device of a simple matrix type according to the first embodiment of the present invention.
Figure 2:
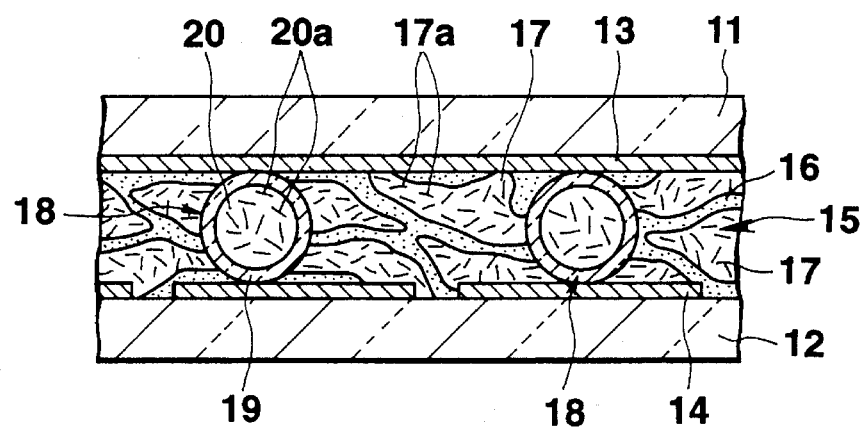
Figure 3:
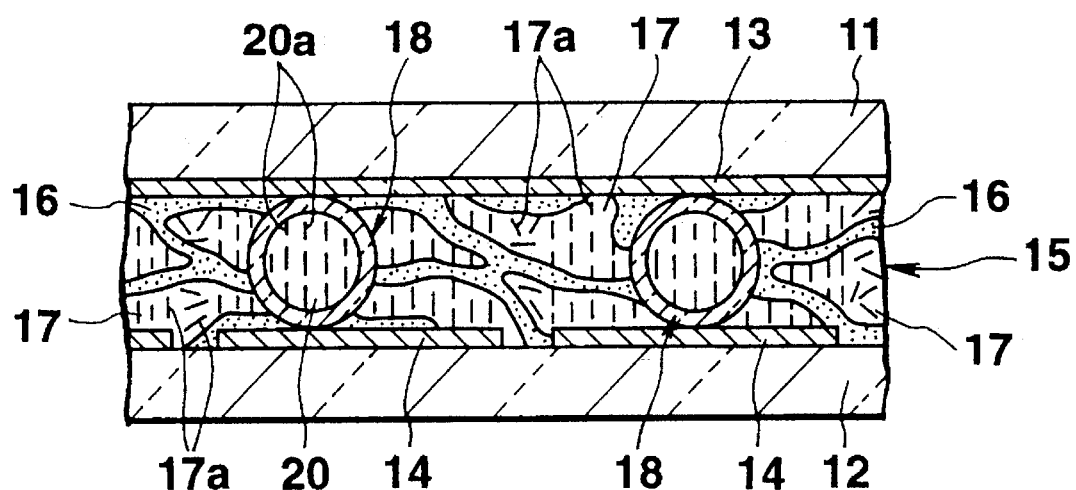

FIG. 1 is a plan view showing a polymer dispersed liquid crystal display device according to this embodiment, FIG. 2 is a sectional view showing the polymer dispersed liquid crystal display device of this embodiment in a state wherein no voltage is applied, and FIG. 3 is a sectional view showing the polymer dispersed liquid crystal display device in a state wherein a voltage is applied.

The polymer dispersed liquid crystal display device of this embodiment is formed as follows. That is, a pair of transparent substrates (e.g., glass substrates) 11 and 12 having transparent electrodes 13 and 14 formed on the opposing surfaces thereof are bonded to each other through a seal member 21 to constitute a cell 10, and a phase-separation polymer dispersed liquid crystal layer (a composite film consisting of a phase-separation liquid crystal and a polymer resin) 15 is arranged in an area formed by the transparent substrates 11 and 12 and the seal member 21.

The gap between the transparent substrates 11 and 12 is regulated by spacers 18 arranged at various positions in the area.

The polymer dispersed liquid crystal display device is of a simple matrix type. Each transparent electrode 13 formed on the transparent substrate 11 is, e.g., a scanning electrode, and the transparent electrode 14 formed on the transparent substrate 12 is, e.g., a signal electrode.

The phase-separation polymer dispersed liquid crystal layer 15 is formed using phase separation between a liquid crystal and a polymer resin caused by photopolymerization, heat polymerization, or the like and has a structure obtained by dispersing a liquid crystal 17 in a polymer resin layer 16. More specifically, the polymer resin layer 16 has a sponge-like sectional structure (network-like structure), and the liquid crystal 17 is almost confined in the spaces of the polymer resin layer 16 to form liquid crystal domains. The liquid crystal in each domain is not accurately independent, and the liquid crystal in a given domain is connected to the liquid crystal in at least one of domains adjacent to the given domain. That is, the liquid crystal in the domains continues. In this embodiment, as the liquid crystal 17, a nematic liquid crystal having positive dielectric anisotropy is used.

Figure 4:
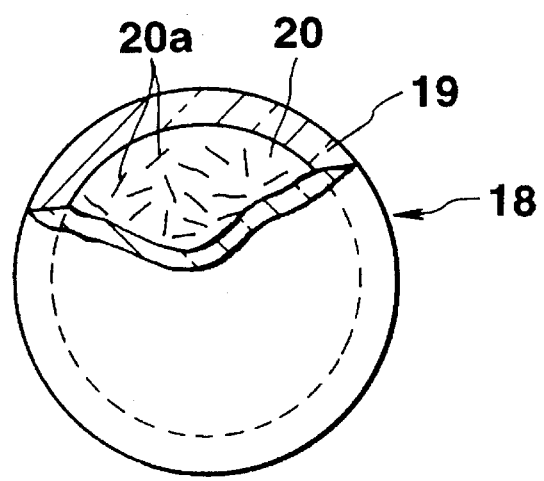
FIG. 4 is a view showing the structure of a spacer.

Each spacer 18, as shown in FIG. 4, is obtained by filling a liquid crystal 20 in a transparent spherical capsule 19 consisting of glass or a hard resin. The outer diameter of the spacer 18 is 5 to 30 μm, and is set to be almost equal to a desired gap between the transparent substrates 11 and 12.

The liquid crystal 20 in the spacers 18 is a nematic liquid crystal having positive dielectric anisotropy, like the liquid crystal 17.

The polymer dispersed liquid crystal display device shown in FIGS. 1 to 3 is manufactured by the following method.

The spacers 18 are sprayed on one of the transparent substrates 11 and 12 having the transparent electrodes 13 and 14 formed thereon. A seal member (e.g., a thermosetting resin) 21 is printed on the other substrate. The transparent substrate 11 overlaps the transparent substrate 12, and they are pressed from both sides of the substrates such that the gap between the transparent substrates 11 and 12 becomes a gap (desired gap) regulated by the spacers 18. When the gap between the transparent substrates 11 and 12 becomes the desired gap, the seal member 21 is set to bond both the transparent substrates 11 and 12 to each other.

The gap between the transparent substrates 11 and 12 is determined when a pressing force acting on the transparent substrates 11 and 12 and the reaction force of the spacers 18 are balanced. Note that, since the liquid crystal 20 is filled in the capsules 19, the spacers 18 can sufficiently withstand the pressing force.

A material for forming the phase-separation polymer dispersed liquid crystal layer 15 is injected into the area formed by the transparent substrates 11 and 12 and the seal member 21. This material consists of a solution mixture of the liquid crystal 17 and, in this embodiment, a polymerization material such as a monomer or an oligomer for causing a radical polymerization reaction with light. This solution mixture is injected into a injecting port formed in a portion of the seal member 21 by a vacuum injecting method or the like. After the solution mixture is injected, the injecting port is sealed. The content of the liquid crystal 17 is set to be 30 to 80 wt% with respect to the formed phase-separation polymer dispersed liquid crystal layer 15. Note that, when the content of the liquid crystal 17 is small, each domain of the liquid crystal 17 has a spherical shape.

Thereafter, light (ultraviolet ray) is radiated on the entire area in which the solution mixture is sealed. When light is radiated on the solution mixture, the double bond of the monomer or oligomer of the polymerization material is released to form radicals, and adjacent radicals are combined with each other to cause a radical polymerization reaction. The polymer resin 16 formed by this polymerization reaction and the liquid crystal 17 cause phase separation, thereby forming the polymer resin layer 16 having a network-like sectional structure. The liquid crystal 17 is confined in each space of the polymer resin layer 16 to form a liquid crystal domain. Note that the method of forming the phase-separation polymer dispersed liquid crystal layer 15 is called a photopolymerization phase-separation method.

When the phase-separation polymer dispersed liquid crystal layer 15 is formed, the polymer dispersed liquid crystal display device is completed.

In the polymer dispersed liquid crystal display device of this embodiment, as shown in FIG. 2, when no voltage is applied across the transparent electrodes 13 and 14 of the transparent substrates 11 and 12, liquid crystal molecules 17a and 20a are aligned along the polymer resin layer 16 or the wall surface of each of the spherical capsules 19. Therefore, the liquid crystal molecules 17a and 20a are pointed in various directions, i.e., are set in a randomly aligned state. In this state, the refractive indexes of the liquid crystal 17 and the polymer resin 16 are different from each other. Similarly, the refractive indexes of the liquid crystal 20 and the spherical capsule 19 are different from each other. For this reason, light incident on the polymer dispersed liquid crystal display device is refracted or reflected at the interface between the liquid crystal 17 and the polymer resin and the interface between the liquid crystal 20 and the transparent capsule 19, and is scattered. The incident light is also scattered by the liquid crystal molecules 17a and 20a themselves aligned at random. For this reason, the display of the liquid crystal display device becomes fogged (dark).

On the other hand, as shown in FIG. 3, in a voltage application state, i.e., in a state wherein a voltage exceeding a threshold value is applied across the transparent electrodes 13 and 14, the liquid crystal molecules 17a and 20a are uniformly aligned in a direction perpendicular to the transparent substrates 11 and 12 according to the applied voltage. In this state, the refractive indexes of the liquid crystal 17 and the polymer resin layer 16 become almost equal to each other in the direction perpendicular to the major surfaces of the transparent substrates 11 and 12. In addition, the refractive indexes of the liquid crystal 20 and the transparent capsule 19 become almost equal to each other in the direction perpendicular to the major surfaces of the transparent substrates 11 and 12. Therefore, light incident on the polymer dispersed liquid crystal display device 10 passes through the phase-separation polymer dispersed liquid crystal layer 15 and the spacers 18 without being scattered. The light is rarely scattered by the liquid crystal molecules 17a and 20a.

As described above, in the polymer dispersed liquid crystal display device of this embodiment, like the phase-separation polymer dispersed liquid crystal layer 15, the spacers 18 also scatter light in a state wherein no voltage is applied and transmit light in a state wherein a voltage is applied. That is, the spacers 18 serve as part of the phase-separation polymer dispersed liquid crystal layer 15. Therefore, a high-quality display image can be obtained without bright or black points formed in the display image by the spacers 18.

In addition, in this embodiment, since a nematic liquid crystal having positive dielectric anisotropy is used as the liquid crystal 20 in the spacers 18 like the liquid crystal 17 of the phase-separation polymer dispersed liquid crystal layer 15, the aligned states of the liquid crystal molecules 17a and 20a in a state wherein a voltage is applied are almost identical to each other. For this reason, the transmittances of the composite film 15 and the spacers 18 are almost equal to each other. The light scattering effects of the phase-separation polymer dispersed liquid crystal layer 15 and the spacers 18 in a state wherein no voltage is applied are almost equal to each other. Moreover, the gap between the substrates is kept at a predetermined gap, and display ununiformity caused by a change in thickness of the phase-separation polymer dispersed liquid crystal layer 15 does not occur. Therefore, the polymer dispersed liquid crystal display device of this embodiment can display an image having quality higher than that of a polymer dispersed liquid crystal display device which uses no spacers.

According to the polymer dispersed liquid crystal display device 10, the domains of the liquid crystal 20 in the spacers 18 and the domains of the liquid crystal 17 of the phase-separation polymer dispersed liquid crystal layer 15 are different from each other in shape and size. Therefore, the mobility (easy-to-align) of the liquid crystal molecules 17a with respect to the applied electric field is different from that of the liquid crystal molecules 20a. In addition, when a voltage is applied across the transparent electrodes 13 and 14, voltages having different values are applied to the liquid crystals 17 and 20, respectively. For this reason, the aligned state of the liquid crystal molecules 17a and the aligned state of the liquid crystal molecules 20a become almost identical to each other in a state wherein no electric field is applied and a state wherein a voltage exceeding a threshold value is applied. However, in a state wherein an intermediate voltage is applied, the aligned state of the liquid crystal molecules 17a becomes different from that of the liquid crystal molecules 20a.

Figure 5:
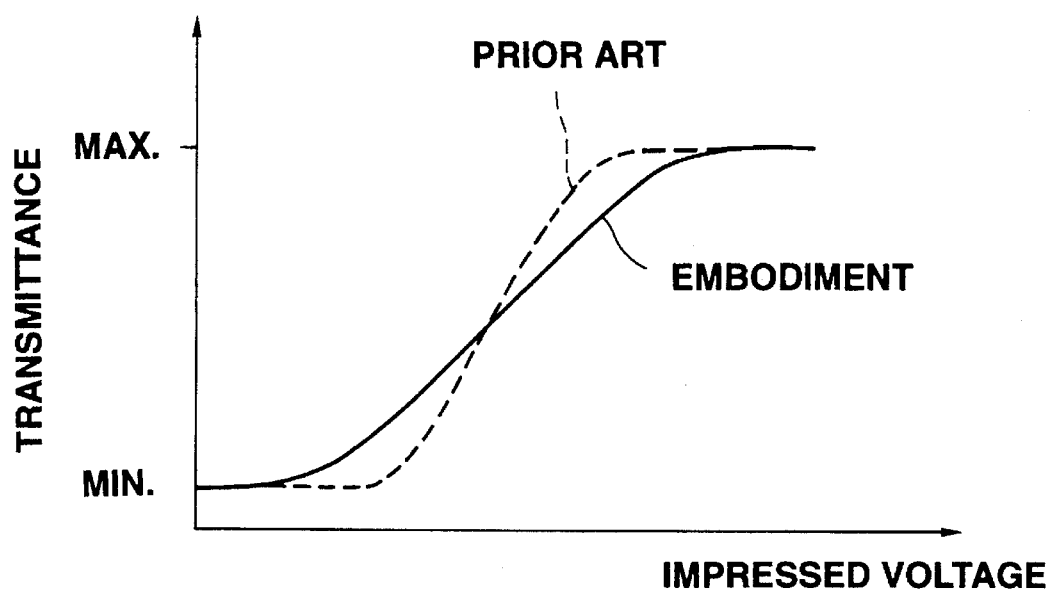
FIG. 5 is a graph showing the relationship between an applied voltage and a transmittance.

For this reason, when the domain of the liquid crystal 20 and the domain of the liquid crystal 17 are present in one pixel, as shown in FIG. 5, a change in transmittance with respect to an applied voltage is more gradual than that in a case wherein only the domain of the liquid crystal 17 is present in one pixel. Note that the graph in FIG. 5 indicates changes in transmittance obtained when a voltage applied across the opposing transparent electrodes 13 and 14 is increased. In FIG. 5, the solid line indicates the characteristic curve of the device of this embodiment, and the broken line indicates the characteristic curve of a conventional device.

More specifically, in the polymer dispersed liquid crystal display device of this embodiment, finer display gradation can be controlled by controlling the applied voltage. When the density of the spacers 18 and the sizes of the liquid crystal domains relative to the sizes of the spacers 18 are properly selected to control the steepness of electrooptical characteristics, a polymer dispersed liquid crystal display device capable of easily performing a gradation display can be obtained.

When the liquid crystal 17 and the liquid crystal 20 consist of different types of liquid crystals, a response itself of the liquid crystal molecules of the liquid crystal 17 with respect to an applied voltage is different from that of the liquid crystal 20. For this reason, a change in transmittance with respect to the applied voltage can be made more moderate (gradual). Therefore, in the polymer dispersed liquid crystal display device which performs a gradation display, the liquid crystals 17 and 20 can advantageously consist of nematic liquid crystals which are different in dielectric anisotropy, respectively. In addition, the liquid crystals 17 and 20 advantageously consist of different types of liquid crystals such that one of the liquid crystals 17 and 20 consists of a cholesteric liquid crystal, and the other consists of a nematic liquid crystal.

Figure 6:
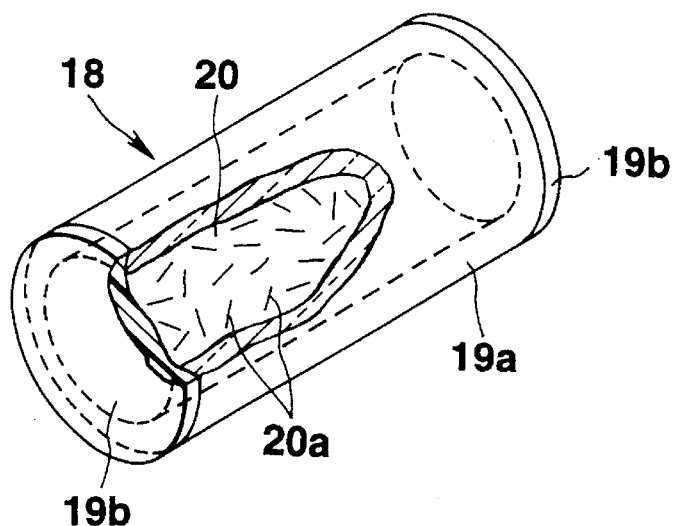
FIG. 6 is a graph showing the structure of another spacer.

In the above embodiment, as each of the spacers 18, a spacer obtained by filling the liquid crystal 20 in the spherical capsule 19 is used. However, as the spacer 18, a fiber-like (cylindrical) spacer as shown in FIG. 6 may be used. The spacer 18 in FIG. 6 is formed as follows. That is, the liquid crystal 20 is filled in a transparent cylindrical capsule 19a consisting of a hollow glass fiber which is cut short, and both the ends of the capsule 19a are sealed with a transparent resin 19b or the like.

(Second Embodiment)

The second embodiment of the present invention will be described below.

In the first embodiment, the following example has been described. That is, a liquid crystal is sealed in transparent capsules constituting spacers, and the transparent capsules are dispersed in a phase-separation polymer dispersed liquid crystal layer, thereby arranging capsuled liquid crystal domains in the phase-separation polymer dispersed liquid crystal layer. The present invention is not limited to the embodiment described above. For example, as shown in FIG. 7 as a section, liquid crystal capsules 28 each having an arbitrary size may be arranged in a polymer dispersed liquid crystal layer 15 independently of spacers.

Figure 7:
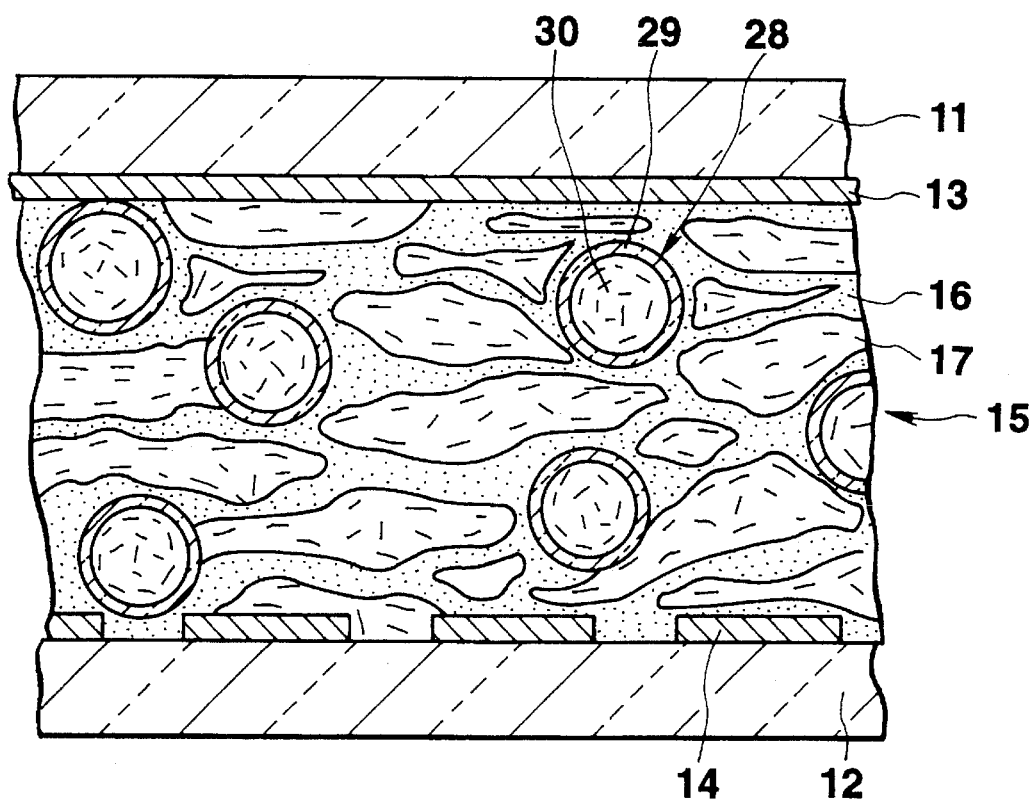
FIG. 7 is an enlarged sectional view showing a polymer dispersed liquid crystal display device of a simple matrix type according to the second embodiment of the present invention.

Each of the liquid crystal capsules 28 in FIG. 7 is constituted by a spherical transparent resin capsule 29 and a liquid crystal sealed in the transparent resin capsule 29, and has an outer diameter sufficiently smaller than the gap between transparent substrates 11 and 12. The liquid crystal capsule 28 has an outer diameter of, e.g., about 1 to 15 μm.

According to this arrangement, each domain of a liquid crystal 17 in the phase-separation polymer dispersed liquid crystal layer 15 and each capsuled liquid crystal domain 30 are different from each other in shape (spherical shape) and size. Therefore, a change in transmittance with respect to an applied voltage (electric field) is made moderate, and a gradation display can be easily performed.

when the outer diameter of each of the liquid crystal capsules 28 and the arrangement density of the liquid crystal capsule 28 are properly selected, the steepness of voltage-transmittance characteristics can be controlled.

In this arrangement, the liquid crystal capsules 28 are preferably arranged at a density such that one or more liquid crystal capsules 28 are arranged in one pixel.

A method of manufacturing a polymer dispersed liquid crystal display device having the arrangement shown in FIG. 7 will be described below. (1) A method of forming liquid crystal capsules will be described first.

A capsule medium is purified to remove materials such as salts which cause a decrease in impedance of a capsule. As the capsule medium, e.g., polyvinyl alcohol (PVA), gelatine, Carbopole, and Gantrez can be used. A combination of these materials and another polymer (e.g., PVA) may be used as the capsule medium.

The capsule medium, a liquid crystal material, and a carrier medium such as water are mixed with each other. This mixing is performed by various mixers such as a blender or a colloid mill. Note that each of the contents of the capsule medium and the liquid crystal material in the solution mixture is preferably set to be about 5 to 20 wt%.

By this mixing, an emulsion consisting of these components is prepared. The carrier medium of the emulsion is removed by a drying process or the like, and the capsule medium is set, thereby forming the almost spherical liquid crystal capsules 28.

The formed liquid crystal capsules 28 are classified in accordance with their outer diameters, and the liquid crystal capsules 28 each having a desired size are used. For example, when the liquid crystal capsules 28 each having an outer diameter equal to the gap between the opposing transparent substrates 11 and 12 are used, as in the first embodiment, the liquid crystal capsules 28 function as spacers.

The liquid crystal capsules 28 are dispersed in an aqueous solution (a solution mixture of a monomer, an oligomer, an adjustor, or the like) of a polymerization material obtained by polymerizing the liquid crystal 17, polyvinyl alcohol (PVA), or the like. The resultant aqueous solution is applied or printed on one substrate. Thereafter, this substrate adheres to the other substrate through a seal member 21. In this case, the liquid crystal capsules 28 themselves may be used as spacers, or spacers may be arranged independently of the liquid crystal capsules 28. Note that the content of the liquid crystal 17 to be added with respect to the formed phase-separation polymer dispersed liquid crystal layer 15 is about 30 to 80 wt%.

The polymerization material is polymerized by radiating light on the resultant liquid crystal element or heating it. In this manner, the polymerization material is polymerized to cause phase separation between the liquid crystal 17 and a polymer resin 16, thereby forming the phase-separation polymer dispersed liquid crystal layer 15 while the liquid crystal capsules 28 are present in the phase-separation polymer dispersed liquid crystal layer 15. With the above processes, a copolymer dispersed liquid crystal display device having a composite layer constituted by the liquid crystal capsules 28 and the phase-separation polymer dispersed liquid crystal layer 15 is completed. (2) When each of the liquid crystal capsules 28 to be used has an outer diameter sufficiently smaller than the gap between the transparent substrates 11 and 12, the following manufacturing method is also effective.

Figure 8A:
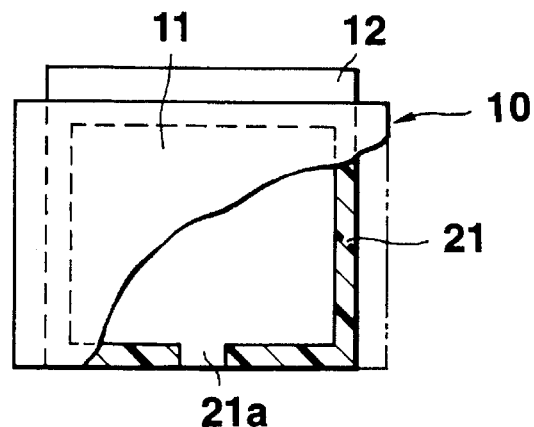
FIGS. 8A to 8C are views for explaining a method of manufacturing the polymer dispersed liquid crystal display device shown in FIG. 7.

As shown in FIG. 8A, the pair of transparent substrates 11 and 12 are bonded to each other through the seal member 21 to constitute a cell 10. The seal member 21 has a injecting port 21a.

The liquid crystal capsules 28 are added, in a predetermined content, e.g., about 10 to 50 wt%, to a solution mixture obtained by mixing a polymerization material with a liquid crystal 30 (30 to 80 wt% with respect to the entire polymer dispersed liquid crystal layer) such as a nematic liquid crystal having positive dielectric anisotropy. The resultant solution mixture is stirred and uniformly mixed.

Figure 8B:
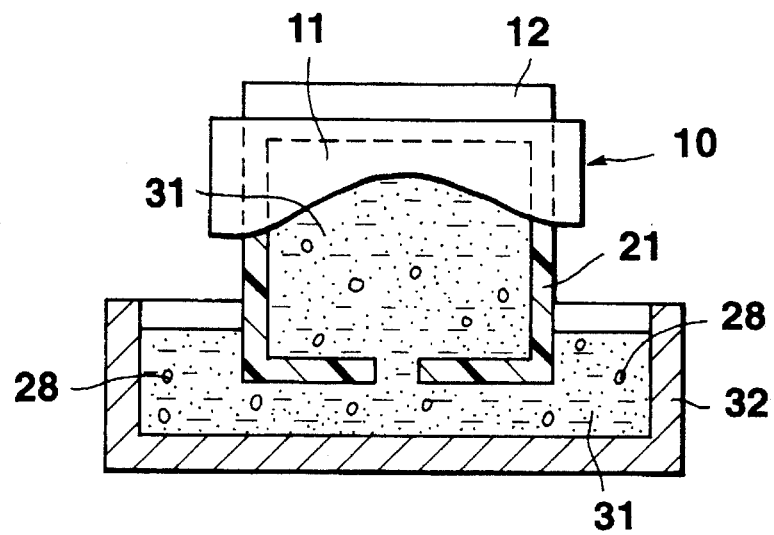

As shown in FIG. 8B, a solution mixture 31 consisting of the liquid crystal 17, the polymerization material, and the liquid crystal capsules 28 are injected into the cell 10 by a vacuum injecting method. Injection of the solution mixture 31 is performed as follows. That is, as in a conventional vacuum injecting method, the cell 10 is set in a vacuum tank, the pressure in the tank is reduced to be set in a vacuum state, and the injecting port 21a of the cell 10 is dipped in the solution mixture 31 in a solution vessel 32. Thereafter, the pressure in the vacuum tank is increased to the atmospheric pressure or a pressure slightly higher than the atmospheric pressure.

Figure 8C:
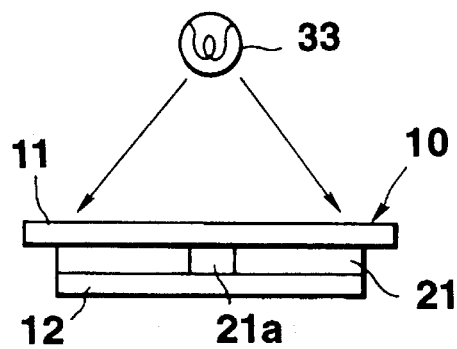

As shown in FIG. 8C, light (ultraviolet ray) from a light source 33 is radiated on the cell 10 to polymerize the polymerization material, thereby forming a composite layer constituted by the liquid crystal capsules 28 and the phase-separation polymer dispersed liquid crystal layer 15 on the liquid crystal element. In other words, a light scattering/transmission control film is formed, in which liquid crystal domains each having a definite shape and constituted by the liquid crystal capsules 28 and liquid crystal domains each having an indefinite shape and formed by phase separation are present in the polymer resin layer 16.

The injecting port 21a of the cell 10 is sealed by a photosetting resin or the like, thereby completing the polymer dispersed liquid crystal display device shown in FIG. 7.

The manufacturing method described above is only an example, and other manufacturing processes or other component amounts may be used. In addition, each of the liquid crystal domains of the liquid crystal capsules 28 may be formed to have a size substantially equal to the size of each of the domains of the liquid crystal 17.

In each of the first and second embodiments, the polymer dispersed liquid crystal display device of a simple matrix type has been described. However, the present invention can be applied to a polymer dispersed liquid crystal display device of an active matrix type having a sectional structure shown in FIG. 9.

Figure 9:
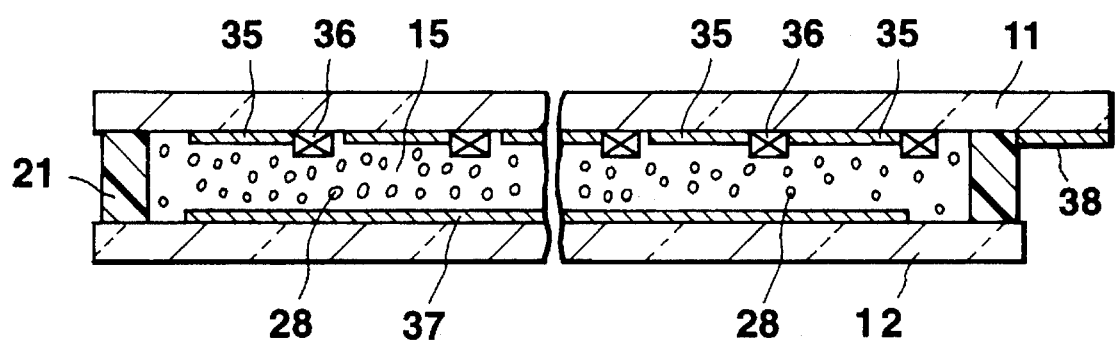
FIG. 9 is a sectional view showing a polymer dispersed liquid crystal display device of an active matrix type.

Referring to FIG. 9, pixel electrodes 35 and active elements 36 constituted by thin film transistors (TFTs) or the like are formed on a transparent substrate 11 constituting one of transparent substrates, and one counter electrode 37 is formed on a transparent substrate 12 constituting the other of the transparent substrates. A composite film 15 constituted by liquid crystal capsules 28 and a phase-separation polymer dispersed liquid crystal layer is formed between both the transparent substrates 11 and 12. Note that electrodes 38 such as a gate line connected to the gate of each of the thin film transistors 36 and a data line connected to the drain thereof are formed on the transparent substrate 11.

(Third Embodiment)

As has been described above, the polymer dispersed liquid crystal display device according to each of the first and second embodiments is free from bright or black points which are formed by spacers, and it is suitable for a gradation display. Therefore, each of these polymer dispersed liquid crystal display devices is most suitable as a display device of an enlargement projection display apparatus. For this reason, in the third embodiment, a liquid crystal projector which uses the polymer dispersed liquid crystal display device of the first or second embodiment as a display device will be described below.

Figure 10:
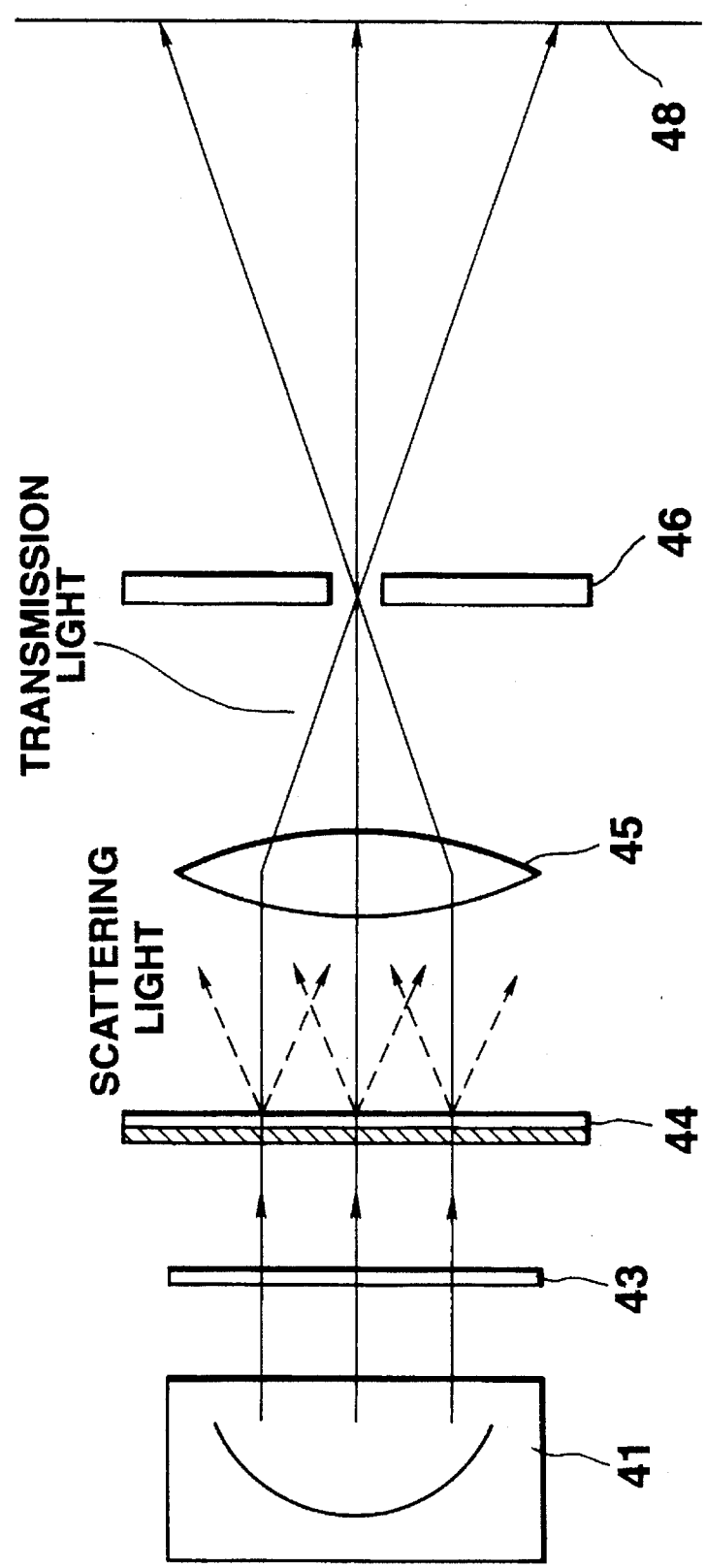
FIG. 10 is a view showing the arrangement of a liquid crystal projector using, as a display device, each of the polymer dispersed liquid crystal display devices according to the first and second embodiments of the present invention.

As shown in FIG. 10, this liquid crystal projector comprises a light source 41, a condenser lens 43, a display device 44, a projection lens 45, and a diaphragm 46.

In order to effectively use light, the light source 41 is obtained by integrally arranging a reflecting mirror and a light-emitting tube such as a metal halide lamp. A color filter is constituted using a dye and a pigment, or a color filter is constituted by an optical multilayered film. The color filter is integrated with the display device 44. Three primary color (red, green, and blue) filters may be arranged on one substrate, and filters having different colors may be formed on three substrates, respectively. In this case, the condenser lens 43 and display device 44 are arranged for each color, and the display images of the three display devices are synthesized.

The display element 44 is constituted by the polymer dispersed liquid crystal display device according to the first embodiment. When each pixel of the display device 44 is set in an ON state (transmits light), light emitted from each pixel reaches a screen 48 through the projection lens 45 and the diaphragm 46, thereby projecting the image onto the screen 48. On the other hand, when each pixel of the display device 44 is set in an OFF state, light emitted from each pixel is scattered light. For this reason, light transmitted through the display device 44 is scattered and then cut by the diaphragm 46.

As the screen 48, a front type screen using light projected from the projection lens 45 as reflected light or a rear type screen using the light projected as transmitted light may be used.

With the above arrangement, the display image of the display device 44 is projected onto the screen 48. At this time, as described above, spacers control scattering/transmission of light in accordance with an applied voltage like the phase-separation composite film 15. For this reason, a high-quality image can be displayed without forming bright or black points which are formed by enlarged and projected image spacers.

As has been described above, according to the polymer dispersed liquid crystal display device of this embodiment, a gradation display can be easily performed. In addition, since liquid crystal capsules are used as spacers, a high-quality image having a high contrast can be displayed without forming bright or black points which are formed in the displayed screen by spacers.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A polymer dispersed liquid crystal display device comprising:

a pair of opposing substrates having electrodes formed on opposing surfaces thereof; and a composite film arranged between said pair of substrates and having a plurality of first liquid crystal domains each of which is obtained by surrounding a liquid crystal with a polymer thin film and a plurality of second liquid crystal domains which are formed such that a liquid crystal is present in a polymer thin film, said liquid crystal of said second liquid crystal domains being continuous.

2. A device according to claim 1, wherein each of said first liquid crystal domains forms a liquid crystal capsule obtained by sealing said liquid crystal in a small area surrounded by said polymer thin film.

3. A device according to claim 2, wherein said liquid crystal capsules are dispersed through out and arranged in said composite film.

4. A device according to claim 1, wherein said second liquid crystal domains are constituted by said liquid crystal filled in small areas continuously formed in said polymer thin film formed in a mesh-like shape.

5. A polymer dispersed liquid crystal display device comprising:

a pair of opposing substrates having transparent electrodes formed on opposing surfaces thereof; and a composite film arranged between said substrates and having an arrangement obtained by dispersing a polymer and a liquid crystal to each other, wherein said composite film is comprises: a phase-separation polymer matrix liquid crystal layer including said composite film of a liquid crystal and a polymer; and liquid crystal capsules which are dispersed in said phase-separation polymer matrix liquid crystal layer and in which a liquid crystal is sealed.

6. A device according to claim 5, wherein each of said liquid crystal capsules has an outer diameter substantially equal to a gap between said pair of substrates and functions as a spacer for regulating the gap between said pair of substrates.

7. A device according to claim 5, wherein said liquid crystal in said liquid crystal capsules and said liquid crystal in said phase-separation polymer matrix liquid crystal layer comprises substantially the same liquid crystal material.

8. A device according to claim 5, wherein said liquid crystal in said liquid crystal capsules and said liquid crystal in said phase-separation polymer matrix liquid crystal layer comprises different liquid crystal materials, respectively.

9. A device according to claim 5, wherein each of said liquid crystal capsules has substantially a spherical shape.

10. A device according to claim 5, wherein each of said liquid crystal capsules has substantially a cylindrical shape.

11. A device according to claim 5, wherein each of said liquid crystal capsules has an outer diameter substantially equal to a gap between said pair of substrates.

12. A device according to claim 5, wherein each of said liquid crystal capsules has an outer diameter smaller than a gap between said pair of substrates.

13. A device according to claim 5, wherein each of said liquid crystal capsules comprises a hard transparent capsule and a liquid crystal sealed in said transparent capsule.

14. A device according to claim 5, wherein each of said liquid crystal capsules comprises a resin transparent capsule and a liquid crystal sealed in said transparent capsule.

15. A polymer dispersed liquid crystal display device comprising:

a pair of opposing substrates having transparent electrodes formed on opposing surfaces thereof;

a seal member for bonding said pair of substrates to each other; and a polymer matrix liquid crystal layer, arranged in an area formed by said pair of substrates and said seal member, for transmitting and scattering incident light in accordance with a voltage applied across said opposing electrodes, wherein said polymer matrix liquid crystal layer has a plurality of domains arrangement obtained by dispersing a polymer and a liquid crystal, and said domains include capsuled domains each having a predetermined shape and domains each having an indefinite shape and formed by phase separation between the liquid crystal and the polymer.

16. A device according to claim 15, wherein each of said liquid crystal capsules has an outer diameter substantially equal to a gap between said pair of substrates and functions as a spacer for regulating the gap between said pair of substrates.

17. A device according to claim 15, wherein each of said liquid crystal capsules has substantially a spherical shape or a cylindrical shape.

18. A method of manufacturing a polymer dispersed liquid crystal display device, comprising the steps of:

preparing liquid crystal capsules in which a liquid crystal is sealed;

preparing a solution mixture of a liquid crystal and a polymerization material;

mixing said solution mixture with said liquid crystal capsules;

arranging a mixture of said solution mixture and said liquid crystal capsules between a pair of opposing substrates and having transparent electrodes formed on opposing surfaces thereof; and polymerizing the polymerization material in said mixture to cause phase separation between said liquid crystal and a polymer, thereby forming a composite film having an arrangement obtained by dispersing said liquid crystal and said liquid crystal capsules in a layer consisting of the polymer.

19. A method according to claim 18, wherein each of said liquid crystal capsules has an outer diameter substantially equal to a gap between said pair of substrates, and the step of arranging said mixture comprises the step of arranging said mixture on one of said substrates to press the other of said substrates against said one substrate, said liquid crystal capsules functioning as spacers in the step of arranging said mixture.

20. A method according to claim 18, wherein each of said liquid crystal capsules has substantially a spherical shape or a cylindrical shape.

* * * * *